United States Patent [19]
Kishi et al.

[11] Patent Number: 5,502,733
[45] Date of Patent: Mar. 26, 1996

[54] DATA TRANSFER DEVICE

[75] Inventors: Tetsuji Kishi; Ichiro Okabayashi, both of Osaka, Japan

[73] Assignee: Matsushita Electric Industrial Co., Ltd., Osaka, Japan

[21] Appl. No.: 205,144

[22] Filed: Mar. 2, 1994

Related U.S. Application Data

[63] Continuation of Ser. No. 848,848, Mar. 9, 1992, abandoned.

[30] Foreign Application Priority Data

Mar. 8, 1991 [JP] Japan ................... 3-043476

[51] Int. Cl.[6] .................................................. G08C 25/02
[52] U.S. Cl. ........................................................ 371/32
[58] Field of Search ............................ 371/32, 33, 35, 371/30; 370/92

[56] References Cited

U.S. PATENT DOCUMENTS

| | | | |
|---|---|---|---|
| 3,893,072 | 7/1975 | D'Antonio et al. | 371/35 |
| 3,956,589 | 5/1976 | Weathers et al. | 371/32 |
| 4,422,171 | 12/1983 | Wortley et al. | 371/32 |
| 4,829,524 | 5/1989 | Yoshida | 371/32 |
| 4,908,828 | 3/1990 | Tikalsky | 371/32 |
| 5,027,356 | 6/1991 | Nakamura et al. | 371/32 |
| 5,105,423 | 4/1992 | Tanaka et al. | 371/32 |
| 5,124,991 | 6/1992 | Allen . | |
| 5,140,419 | 8/1992 | Galumbeck et al. | 358/143 |
| 5,224,105 | 6/1993 | Higley | 371/32 |

FOREIGN PATENT DOCUMENTS

| | | |
|---|---|---|
| 0272834 | 6/1988 | European Pat. Off. . |
| 0377136 | 7/1990 | European Pat. Off. . |

OTHER PUBLICATIONS

Shinji Tomita, *Theory of Parallel Computer Structure*, Shokodo, pp. 69–99 (1986).

Benelli, "Go–back–N ARQ scheme with buffer at the receiver", IEE Proceedings, vol. 133, Pt. F., No. 3, Jun. 1986, pp. 271–276.

*Primary Examiner*—Robert W. Beausoliel, Jr.
*Assistant Examiner*—Trinh Tu
*Attorney, Agent, or Firm*—Willian Brinks Hofer Gilson & Lione

[57] ABSTRACT

There are provided a data transmitter for sequentially transmitting data to which error correcting codes are added, and a data receiver for returning a retransmission request signal if the received data has errors which cannot be corrected. The data transmitter does not confirm that the retransmission request signal related to the transmitted data is received and data are consecutively transmitted from a FIFO memory in a pipeline fashion while holding the transmitted data in a data latch. The data receiver sequentially stores the received data in the FIFO memory on a receiving end in a pipeline fashion. In the case where the retransmission request signal is transmitted from the data receiver, the data transmitter immediately transmits retransmission data which has been prepared in the data latch.

8 Claims, 16 Drawing Sheets

DATA TRANSFER DEVICE

This is a continuation of application Ser. No. 07/848,848 filed Mar. 9, 1992, now abandoned.

BACKGROUND OF THE INVENTION

The present invention relates to a data transmitter and a data receiver, and a data transfer device which is comprised of their combination.

Recently, there have been proposed various computer systems which have multiprocessor structures with the limitations of the high-speed of computers having single processor structures. Referring to a multiprocessor system, data communication is executed between processors.

FIG. 14 is a block diagram showing the structure of a multiprocessor system according to the prior art. Referring to the multiprocessor system shown in FIG. 14, N processor elements 600 (1) to (N) are linked to one another through an interconnection network 700. The processor element 600 comprises a processor 602 for executing instructions, a memory 604 for storing instructions and data, an internal bus 606, and a data transfer device 608 for data communication with other processor elements. The data transfer device 608 includes an address generating circuit 610, an ECC circuit 612, a data latch 614 and a synchronous processing circuit 616. The address generating circuit 610 has a function of sending to the internal bus 606 addresses for sequentially fetching from the memory 604 data to be transmitted and sequentially storing received data in the memory 604. The ECC circuit 612 has an error correcting code adding circuit 650, an error checking and correction circuit 652 and an error detecting signal output circuit 654 as shown in FIG. 15, and has functions of adding error correcting codes to transmitted data and of checking and correcting the errors of received data. The data latch 614 is a circuit for temporarily holding the transmitted and received data. The synchronous processing circuit 616 serves to synchronize data communication. External buses 618 (1) to (N) are provided between the interconnection network 700 and the data latches 614 of the processor elements 600 (1) to (N). By way of example, the interconnection network 700 has a cross bar net structure as disclosed in "Theory of Parallel Computer Structure" written by Shinji Tomira, Shokodo, 1986, pp 69–99.

FIG. 16 is a time chart showing the operation of the data transfer device 608. There will be described the case where a first processor element 600 (1) and an Nth processor element 600 (N) are linked to each other through the interconnection network 700 and data is transferred from the former to the latter.

In the processor unit 600 (1) as a data source, an address (for example, ADDRESS n) of data to be transmitted is first provided from the address generating circuit 610 to the memory 604 under the control of the synchronous processing circuit 616. Data (DATA n) fetched from the memory 604 based on the address is provided to the ECC circuit 612 through a first bidirectional bus 20. In the ECC circuit 612, an error correcting code is added to the data. Then, the data is transmitted through a second bidirectional bus 22, the data latch 614 and the external bus 618 (1).

In the processor element 600 (N) as a data sink, data received through the external bus 618 (N) is first latched as received data in the data latch 614. The received data having an error correcting code which is latched in the data latch 614 is provided to the error checking and correction circuit 652 of the ECC circuit 612 through the second bidirectional bus 22 and is then checked. In the case where the received data has no errors, the error checking and correction circuit 652 outputs the received data itself to the first bidirectional bus 20. In the case where the errors of the received data can be corrected, data obtained by correcting the received data is outputted to the first bidirectional bus 20. The received data is stored in the memory 604 through the internal bus 606. The storage location in the memory 604 is specified by the address generating circuit 610. In the case where the error checking and correction circuit 652 detects that the received data has errors which cannot be corrected, it generates an error detecting signal 24 through the output circuit 654. The synchronous processing circuit 616 sends to the external bus 618 (N) a response corresponding to the generation of the error detecting signal 24.

In the processor unit 600 (1) as the data source, the response from the processor element 600 (N) is received by the data latch 614 through the external bus 618 (1) and is then received by the synchronous processing circuit 616. As the result of decision on the response, if it is confirmed that the previously transmitted data (for example, DATA n) is correctly received by the data sink, the synchronous processing circuit 616 causes the address generating circuit 610 to generate the next address (ADDRESS n+1) and to transmit the next data (DATA n+ 1). In the case where the synchronous processing circuit 616 receives a response (retransmission request) which indicates that the transmitted data (for example, DATA n+ 1) is not correctly received by the data sink, it causes the address generating circuit 610 to stop the generation of the next address (ADDRESS n+2) and to transmit the same data as retransmission data (RDATA n+1).

Referring to the data transfer device 608 according to the prior art, if it is confirmed that the transferred data is correctly received by the data sink, the next data is transmitted. Consequently, a data transfer speed is low. Therefore, the processing efficiency of the entire multiprocessor system is remarkably lowered.

It is an object of the present invention to realize high-speed data transfer and smooth data retransmission.

SUMMARY OF THE INVENTION

To achieve the above-mentioned object, the present invention adopts a structure in which pipeline processing is incorporated in data transfer and transmitted data is temporarily held for retransmission.

More specifically, the present invention provides a data transmitter for sequentially transmitting data and for receiving a retransmission request signal which is returned when an error is detected in the transmitted data, comprising transmitting data storage means, data fetch control means, data holding means, data transmitting means and data transmitting control means to be described below. The transmitting data storage means serves to store a plurality of data to be transmitted. The data fetch control means serves to sequentially fetch data from the transmitting data storage means. The data holding means serves to hold the data fetched from the transmitting data storage means. The data transmitting means serves to transmit either of the data from the transmitting data storage means and the data held by the data holding means. The data transmitting control means serves to receive the retransmission request signal and to control the operations of the data fetch control means, data holding means and data transmitting means according to the receipt of the retransmission request signal.

Furthermore, the data transmitting control means enables the data fetch control means to fetch a present data from the transmitting data storage means, causes the data transmitting means to transmit the present data from the transmitting data storage means, causes the data holding means to hold the present data from the transmitting data storage means, then enables the data fetch control means to fetch the next data from the transmitting data storage means, causes the data transmitting means to transmit the next data from the transmitting data storage means, and then decides whether the retransmission request signal related to the present data is received so that the following consecutive data transmitting operation or data retransmitting operation is selectively executed according to the result of decision. If it is decided that the retransmission request signal related to the present data is not received, the data transmitting control means executes a series of consecutive data transmitting operations in which the data holding means is caused to hold the next data from the transmitting data storage means, the data fetch control means is enabled to fetch the data after next from the transmitting data storage means, and the data transmitting means is caused to transmit the data after next from the transmitting data storage means. If it is decided that the retransmission request signal related to the present data is received, the data transmitting control means executes a series of data retransmitting operations in which the data holding means is caused to maintain the present data so that the present data is not updated to the next data from the transmitting data storage means, the data fetch control means is inhibited from fetching the data after next from the transmitting data storage means, and the data transmitting means is caused to transmit as a retransmission data the present data held by the data holding means.

According to the above-mentioned structure, when data is transmitted, it is not confirmed that the retransmission request signal related to the data is received and the next data is consecutively transmitted in a pipeline fashion at a high speed. In this case, the transmitted data are sequentially held by the data holding means. In the case where the retransmission request signal is received, the consecutive data transmitting operation is temporarily suspended and the transmitted data held by the data holding means is immediately transmitted as retransmission data. Consequently, there can be realized high-speed data transfer and smooth data retransmission.

Preferably, the data transmitter further comprises address receiving means for receiving addresses each of which indicates data to be transmitted, wherein the data fetch control means has a function of fetching data from the transmitting data storage means storage location of the data is specified by each address received by the address receiving means. According to this structure, the data to be transmitted are sequentially fetched from the transmitting data storage means based on the addresses provided externally. In other words, there can be executed the random access of the transmitting data storage means.

Preferably, the transmitting data storage means includes a FIFO (First-In-First-Out) memory for storing a plurality of data to be transmitted, the data fetch control means includes a FIFO control circuit having a FIFO pointer which specifies storage location of data to be fetched in the FIFO memory, and the FIFO control circuit has functions of updating the FIFO pointer when data fetch is enabled by the data transmitting control means, and of suspending the update of the FIFO pointer when the data fetch is inhibited by the data transmitting control means. According to this structure, even if the addresses are not provided externally, the data to be transmitted are sequentially fetched from the FIFO memory according to the FIFO pointer of the FIFO control circuit in the data transmitter. More specifically, if the data to be transmitted are written to the FIFO memory, the data are transmitted sequentially and automatically.

To avoid the infinite repeat of the data retransmitting operation when permanent failure such as disconnection occurs on a data transfer path, the data transmitter further comprises data retransmission terminating means for terminating the data retransmitting operations of the data transmitting control means when it is detected that retransmission request signals related to the same data are received predetermined times.

The present invention provides a data receiver for sequentially transmitting addresses each of which indicates data to be transferred and for sequentially receiving data transferred according to the transmitted addresses, comprising address generating means, address holding means, address transmitting means, data receiving means and data receiving control means to be described below. The address generating means serves to sequentially generate addresses to be transmitted. The address holding means serves to hold the address from the address generating means. The address transmitting means serves to transmit either of the address from the address generating means and the address held by the address holding means. The data receiving means serves to receive data transferred according to the address transmitted from the address transmitting means, to check the presence of errors in the received data, to output the received data, and to generate an error detecting signal when it is decided that the received data has errors. The data receiving control means serves to control the operations of the address generating means, address holding means and address transmitting means according to the generation of the error detecting signal by the data receiving means.

The data receiving control means enables the address generating means to generate a present address, causes the address transmitting means to transmit the present address from the address generating means, causes the address holding means to hold the present address from the address generating means, enables the address generating means to generate the next address, enable the address transmitting means to transmit the next address from the address generating means, and then decides whether the error detecting signal related to the present data transferred according to the present address transmitted from the address transmitting means is generated by the data receiving means so that the following consecutive address transmitting operation or address retransmitting operation is selectively executed according to the result of decision. If it is decided that the error detecting signal related to the present data is not generated, the data receiving control means executes a series of consecutive address transmitting operations in which the address holding means is caused to hold the next address from the address generating means, the address generating means is enabled to generate the address after next, and the address transmitting means is caused to transmit the address after next from the address generating means. If it is decided that the error detecting signal related to the present data is generated, the data receiving control means executes a series of address retransmitting operations in which the address holding means is caused to maintain the present address so that the present address is not updated to the next address from the address generating means, the address generating means is inhibited from generating the address after next, and the address transmitting means is caused to transmit as a retransmission address the present address held by the address holding means.

According to the above-mentioned structure, after an address is transmitted, it is not confirmed that data transferred according to the address has errors and the next address is consecutively transmitted in a pipeline fashion at a high speed. In this case, the transmitted addresses are sequentially held by the address holding means. In the case where an error detecting signal is generated, the consecutive address transmitting operation is temporarily suspended and the transmitted address held by the address holding means is immediately transmitted as a retransmission address. Consequently, there can be realized high-speed data transfer and smooth data retransmission.

Preferably, the data receiving means has functions of generating the error detecting signal when the received data has errors which cannot be corrected, and of outputting data obtained by correcting the received data when the received data has errors which can be corrected. According to this structure, the time of address retransmitting operation is decreased. Consequently, there are reduced the main causes for preventing the data from being consecutively received.

To avoid the infinite repeat of the address retransmitting operation, the data receiver further comprises address retransmission terminating means for outputting a retransmission inhibiting signal so as to terminate the address retransmitting operations of the data receiving control means when it is detected that the error detecting signals related to the same data are generated by the data receiving means predetermined times.

To store the received data, the data receiver further comprises receiving data storage means for storing data from the data receiving means, and data storage control means for storing data in the receiving data storage means. The data receiving control means further has the following functions. More specifically, the data receiving control means enables the data receiving means to execute the receipt, check and output related to the present data transferred according to the present address transmitted from the address transmitting means, and causes the data storage control means to store the present data outputted from the data receiving means in the receiving data storage means, then enables the data receiving means to receive the next data transferred according to the next address transmitted from the address transmitting means, and then decides whether an error detecting signal related to the present data is generated by the data receiving means so that the following consecutive data receiving operation or data re-receiving operation is selectively executed according to the result of decision. If it is decided that the error detecting signal related to the present data is not generated, the data receiving control means executes a series of consecutive data receiving operations in which the present data stored in the receiving data storage means by the data storage control means is confirmed so that the present data remains, the data receiving means is enabled to execute the check and output related to the next data which has been received, the data storage control means is caused to store the next data outputted from the data receiving means in the receiving data storage means, and the data receiving means is enabled to receive the data after next transferred according to the address after next transmitted from the address transmitting means. If it is decided that the error detecting signal related to the present data is generated, the data receiving control means executes a series of data re-receiving operations in which the present data stored in the receiving data storage means by the data storage control means is revoked so that the present data is canceled, the data receiving means is inhibited from executing the check and output related to the next data which has been received and is enabled to execute the receipt, check and output related to the retransmission data transferred according to the present address transmitted as a retransmission address from the address transmitting means, and the data storage control means is caused to store the retransmission data outputted from the data receiving means in the receiving data storage means.

According to the above-mentioned structure, after data is received, it is not confirmed that the data has errors and the next data is consecutively received in a pipeline fashion at a high speed. In the case where an error detecting signal related to the data (present data) is generated, the consecutive data receiving operation is temporarily suspended and both the received present data having errors and the received next data are abandoned. Consequently, the data can be received at a high speed without causing the confusion of receiving order.

Preferably, the receiving data storage means includes a FIFO (First-In First-Out) memory for storing data from the data receiving means, and the data storage control means includes a FIFO control circuit having a FIFO pointer which specifies storage location of data to be stored in the FIFO memory, and the FIFO control circuit has functions of updating the FIFO pointer when data storage is confirmed by the data receiving control means, and of suspending the update of the FIFO pointer when data storage is revoked by the data receiving control means. According to this structure, even if the addresses are not provided externally, the received data are sequentially stored in the FIFO memory according to the FIFO pointer of the FIFO control circuit in the data receiver. In this case, if the FIFO pointer is not updated, the received data having errors is canceled.

To avoid the infinite repeat of the data re-receiving operation, the data receiver further comprises data re-receiving terminating means for terminating the data re-receiving operations of the data receiving control means when it is detected that error detecting signals related to the same data are generated by the data receiving means predetermined times.

The present invention provides a data transfer device having a decoder provided between a plurality of data transmitters and a data receiver. The data receiver includes the address generating means, address holding means, address transmitting means, data receiving means and data receiving control means, and has functions of sequentially transmitting device addresses each of which is to be decoded to select one of the data transmitters and of sequentially receiving data transferred based on the transmitted device addresses. The decoder has a function of selecting each of the data transmitters as a data transfer source for the data receiver based on the device address transmitted from the data receiver.

According to the above-mentioned structure, one of the data transmitters is selected as a data source based on the device address transmitted from the data receiver. In addition, the device addresses are consecutively transmitted from the data receiver in a pipeline fashion at a high speed. In this case, the transmitted device addresses are sequentially held by the address holding means. In the case where an error detecting signal is generated, the consecutive device address transmitting operation is temporarily suspended and the transmitted device address held by the address holding means is immediately transmitted as a retransmission address. Consequently, there can be realized high-speed data transfer and smooth data retransmission in parallel with the selection of data source.

The present invention provides a data transfer device adapted to be built in each of a plurality of processor elements which are linked to one another through an interconnection network having a plurality of paths. The data transfer device comprises a data receiver which includes the address generating means, address holding means, address transmitting means, data receiving means, data receiving control means and address retransmission stop means. The data receiver is adapted to receive data transferred from other processor elements. The data transfer device further comprises error pass storage means for holding the retransmission address held by the address holding means as an address of a fault path of the interconnection network when the retransmission inhibiting signal is received from the address retransmission terminating means, and for inhibiting the address generating means from generating an address corresponding to the address of the fault path.

According to the above-mentioned structure, in the case where error detecting signals related to the same data are generated predetermined times, the retransmission inhibiting signal is sent to the error pass storage means. In this case, the retransmission address held by the address holding means specifies the fault path of the interconnection network so that the succeeding address transmission is inhibited. Consequently, in the case where permanent failure occurs on a part of the interconnection network, the reuse of the fault path is prevented. Thus, the reliability of a multiprocessor system can be enhanced.

This and other objects, features and advantages of the present invention will become more apparent upon a reading of the following detailed description and drawings.

DETAILED DESCRIPTION OF THE PREFERRED EMBODIMENTS

There will be described five embodiments according to the present invention with reference to the drawings.

First Embodiment

Figure 1:
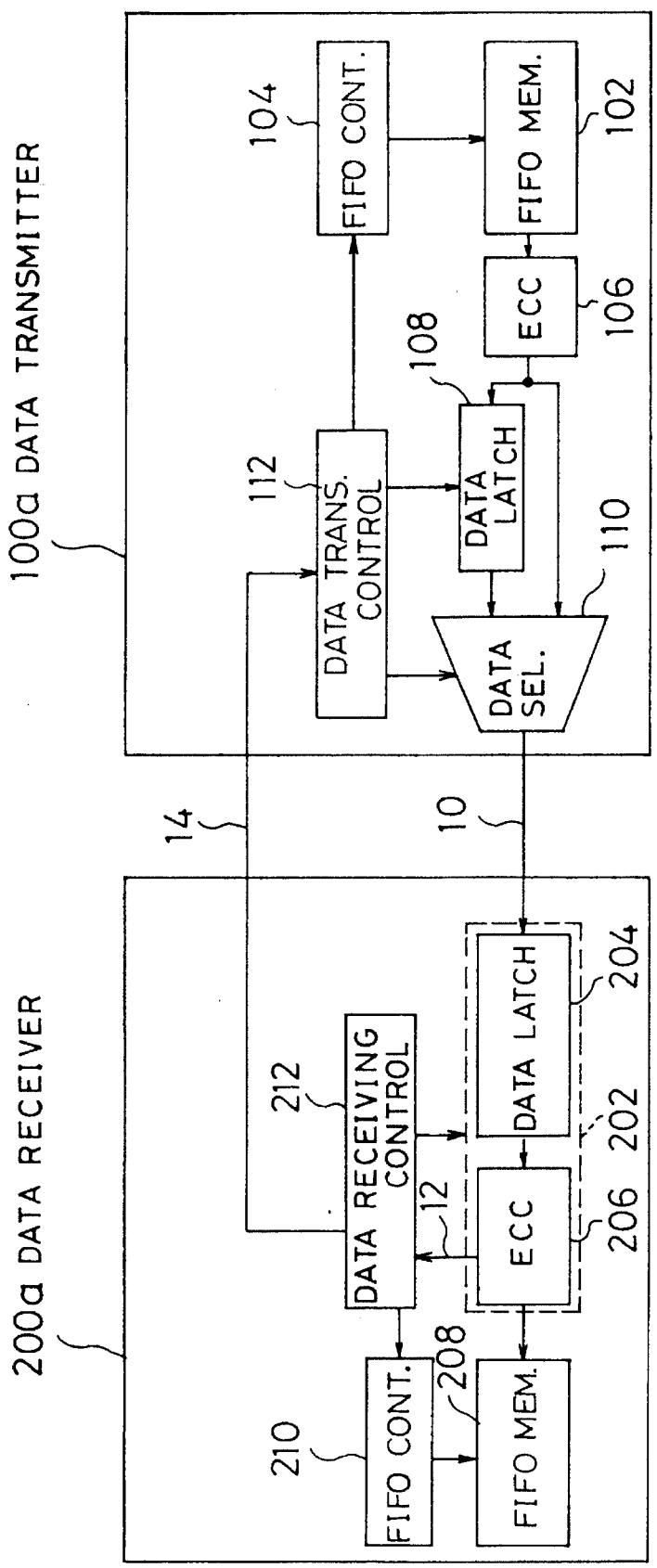
FIG. 1 is a block diagram showing the structure of a data transfer device according to a first embodiment of the present invention.

FIG. 1 is a block diagram showing the structure of a data transfer device according to a first embodiment of the present invention. In FIG. 1, a data transmitter is indicated at 100a and a data receiver is indicated at 200a. Data transfer is executed between the data transmitter 100a and the data receiver 200a. The data transmitter 100a serves to sequentially transmit data 10 and to receive a retransmission request signal 14 which is returned when an error is detected in the transmitted data.

Figure 15:
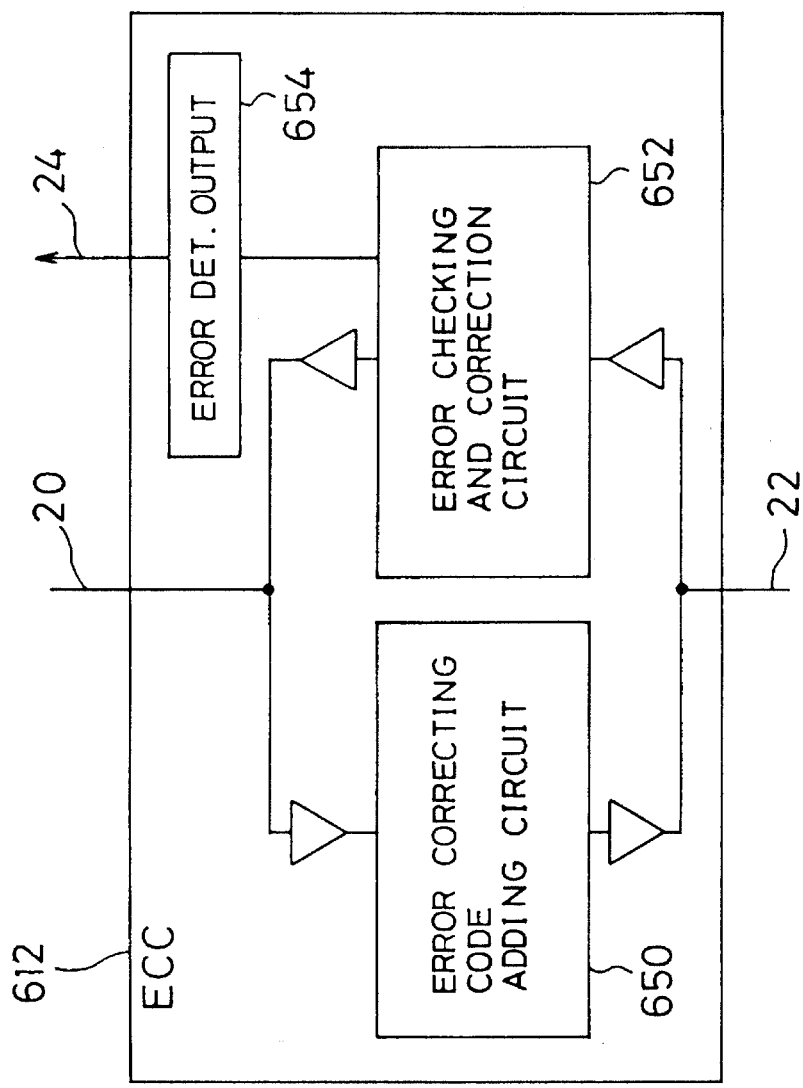
FIG. 15 is a block diagram showing the internal structure of an ECC circuit of the data transfer device shown in FIG. 14.

The data transmitter 100a includes a FIFO memory 102, a FIFO control circuit 104, an ECC circuit 106, a data latch 108, a data selector 110 and a data transmitting control circuit 112. The FIFO memory 102 is a First-In First-Out memory for storing a plurality of data to be transmitted. The FIFO control circuit 104 has a FIFO pointer and serves to control data fetched from the FIFO memory 102. The FIFO pointer specifies the storage location of data to be fetched in the FIFO memory 102. The ECC circuit 106 has an error correcting code adding circuit which is the same as in FIG. 15. The data latch 108 is a circuit for sequentially holding data which are obtained by adding error correcting codes to the data from the FIFO memory 102. The data selector 110 has a function of transmitting as transfer data 10 either of the data obtained by adding error correcting codes to the data from the FIFO memory 102 and the data held by the data latch 108. The data transmitting control circuit 112 serves to receive the retransmission request signal 14 sent from the data receiver 200a and to control the operations of the FIFO control circuit 104, data latch 108 and data selector 110 according to the receipt of the retransmission request signal 14, which will be described below.

The data receiver 200a includes a data receiving circuit 202 having a data latch 204 and an ECC circuit 206, a FIFO memory 208, a FIFO control circuit 210, and a data receiving control circuit 212. The data latch 204 is a circuit for receiving the data 10 from the data transmitter 100a. The ECC circuit 206 has an error detecting and correction circuit and an error detecting signal output circuit which are the same as in FIG. 15. The ECC circuit 206 serves to check the presence of errors in the data sent from the data latch 204 and to output the received data to the FIFO memory 208. As the result of check, when it is decided that the received data has errors which cannot be corrected, the ECC circuit 206 generates an error detecting signal 12. If the received data has errors which can be corrected, the ECC circuit 206 outputs to the FIFO memory 208 data obtained by correcting the received data. The FIFO memory 208 is a First-In First-Out memory for storing data outputted from the ECC circuit 206. The FIFO control circuit 210 has a FIFO pointer and serves to control the storage of data in the FIFO memory 208. The FIFO pointer specifies the storage location of data to be stored in the FIFO memory 208. The data receiving control circuit 212 serves to output the retransmission request signal 14 to the data transmitter 100a and to control the operations of the data receiving circuit 202 and the FIFO control circuit 210 according to the presence of error detecting signal 12 from the ECC circuit 206, which will be described below.

With reference to FIGS. 2 to 5, there will be described the operation of the data transfer device having the above-mentioned structure according to the first embodiment of the present invention.

Figure 2:
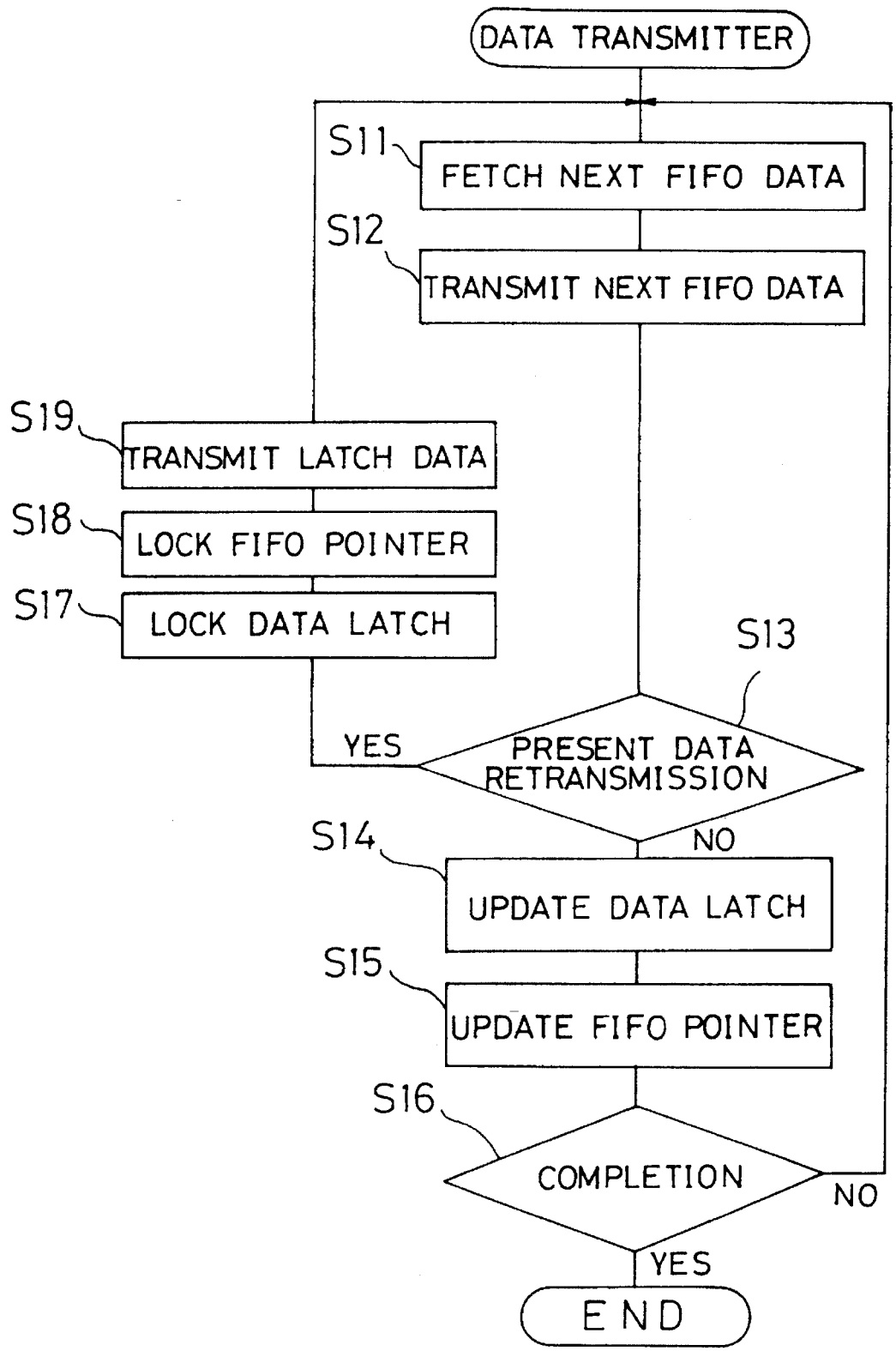
FIG. 2 is a flow chart showing the operation of a data transmitter shown in FIG. 1.

FIG. 2 is a flow chart showing the operation of the data transmitter 100a shown in FIG. 1. As shown in FIG. 2, while the retransmission request signal 14 is not received, the data transmitting control circuit 112 executes a loop in which a step proceeds from S11 to S16 and then returns to S11. More specifically, the FIFO control circuit 104 is enabled to fetch data from the FIFO memory 102. The data from the FIFO memory 102 is transmitted by the data selector 110. The data latch 108 is caused to hold the data from the FIFO memory 102. Thus, data (present data) is transmitted and held by the data latch 108, and the FIFO control circuit 104 is enabled to fetch the next data from the FIFO memory 102 (Step S11). Then, the next data from the FIFO memory 102 is transmitted by the data selector 110 (Step S12). Thereafter, it is decided whether the retransmission request signal 14 related to the present data is received (Step S13).

When it is decided that the retransmission request signal 14 related to the present data is not received, a series of consecutive data transmitting operations are executed. More specifically, the data latch 108 is caused to hold the next data from the FIFO memory 102 (Step S14). The FIFO pointer of the FIFO control circuit 104 is updated (Step S15). The FIFO control circuit 104 is enabled to fetch the data after next from the FIFO memory 102 (Step S11). The data after next from the FIFO memory 102 is transmitted by the data selector 110 (Step S12).

When it is decided that the retransmission request signal 14 related to the present data is received, a series of data retransmitting operations are executed. More specifically, the present data held by the data latch 108 is not updated to the next data from the FIFO memory 102 but is maintained (Step S17). The update of the FIFO pointer of the FIFO control circuit 104 is inhibited so that the data after next is inhibited from being fetched from the FIFO memory 102 (Step S18). The present data held by the data latch 108 is transmitted as retransmission data by the data selector 110 (Step S19). The data retransmitting operation is repeated while the retransmission request signal 14 is received.

Figure 3:
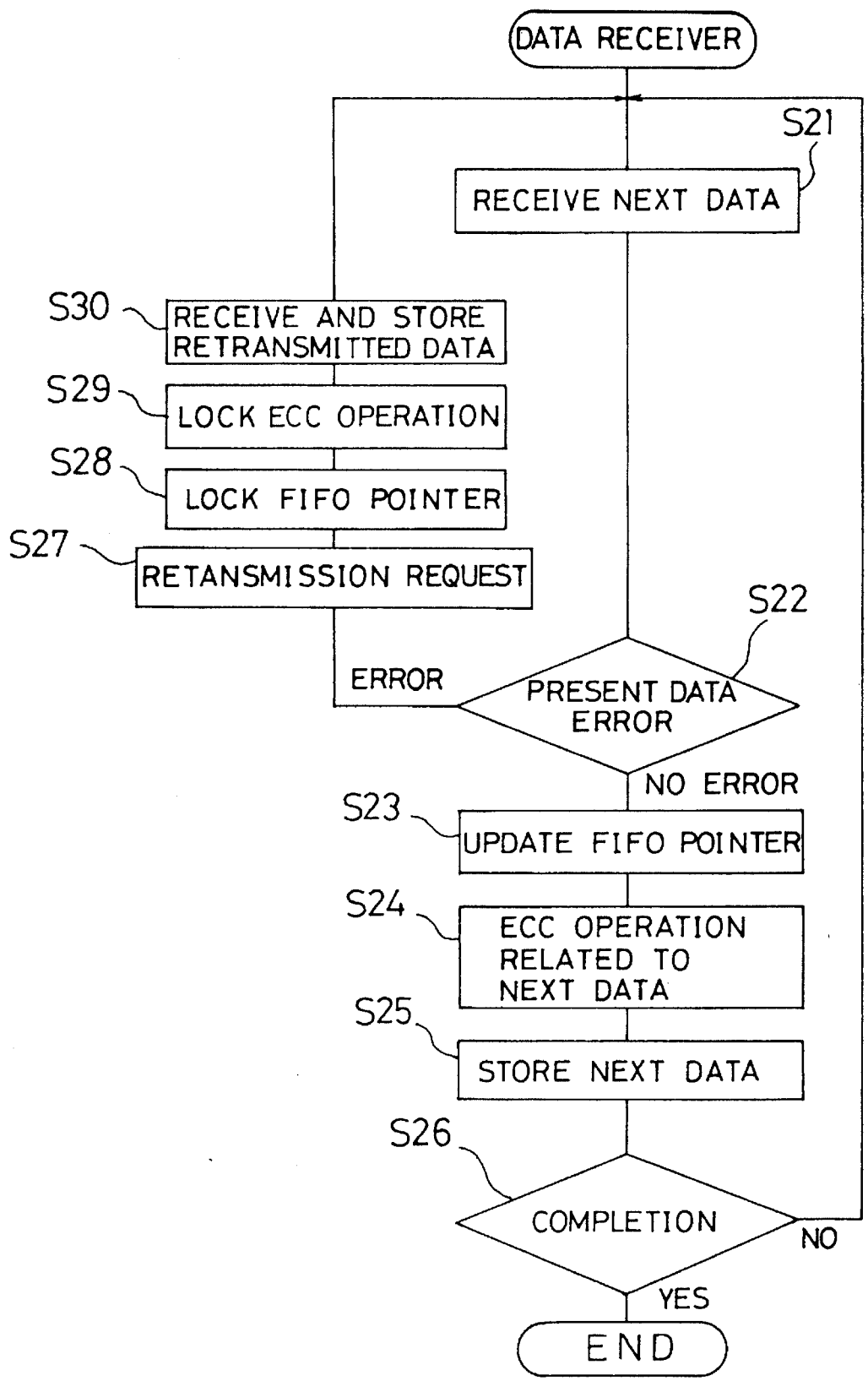
FIG. 3 is a flow chart showing the operation of a data receiver shown in FIG. 1.

FIG. 3 is a flow chart showing the operation of the data receiver 200a shown in FIG. 1. As shown in FIG. 3, while the error detecting signal 12 is not generated, the data receiving control circuit 212 executes a loop in which a step proceeds from S21 to S26 and then returns to S21. More specifically, the data receiving circuit 202 is enabled to receive the data transferred from the data transmitter 100a. The data outputted from the data receiving circuit 202 is stored in the FIFO memory 208. Thus, data (present data) is stored in the FIFO memory 208 and the data latch 204 is caused to receive the next data transferred from the data transmitter 100a (Step S21). Then, it is decided whether the error detecting signal 12 related to the present data which has been received is generated by the ECC circuit 206 (Step S22). In this case, the FIFO pointer of the FIFO control circuit 210 indicates a region of the FIFO memory 208 in which the present data has been stored.

When it is decided that the error detecting signal 12 related to the present data is not generated, a series of consecutive data receiving operations are executed. More specifically, the present data stored in the FIFO memory 208 is approved to update the FIFO pointer of the FIFO control circuit 210 (Step S23). The ECC circuit 206 is enabled to execute the check and output related to the next data which has been received (Step S24). The next data outputted from the ECC circuit 206 is stored in the FIFO memory 208 (Step S25). The data latch 204 is caused to receive the data after next transferred from the data transmitter 100a (Step S21).

When it is decided that the error detecting signal 12 related to the present data is generated, a series of data re-receiving operations are executed. More specifically, the retransmission request signal 14 is returned to the data transmitter 100a (Step S27). The update of the FIFO pointer of the FIFO control circuit 210 is inhibited such that the present data (having errors) stored in the FIFO memory 208 is abandoned (Step S28). The check and output related to the next data are inhibited from being executed by the ECC circuit 206 such that the next data which has been received is neglected (Step S29). The data receiving circuit 202 is enabled to execute the receipt, check and output related to the retransmission data transferred from the data transmitter 100a, and the retransmission data outputted from the data receiving circuit 202 is stored in the FIFO memory 208 according to the locked FIFO pointer (Step S30). The data re-receiving operation is repeated while the error detecting signal 12 is generated by the ECC circuit 206.

Figure 4:
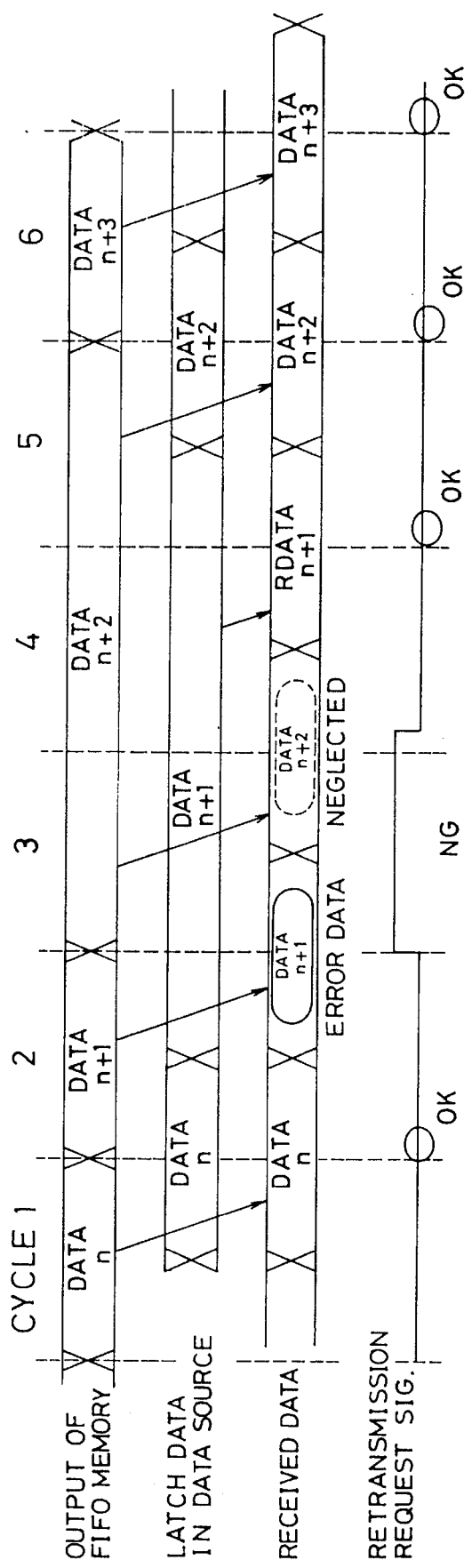
FIG. 4 is a time chart showing the operation of the data transfer device shown in FIG. 1.
Figure 16:
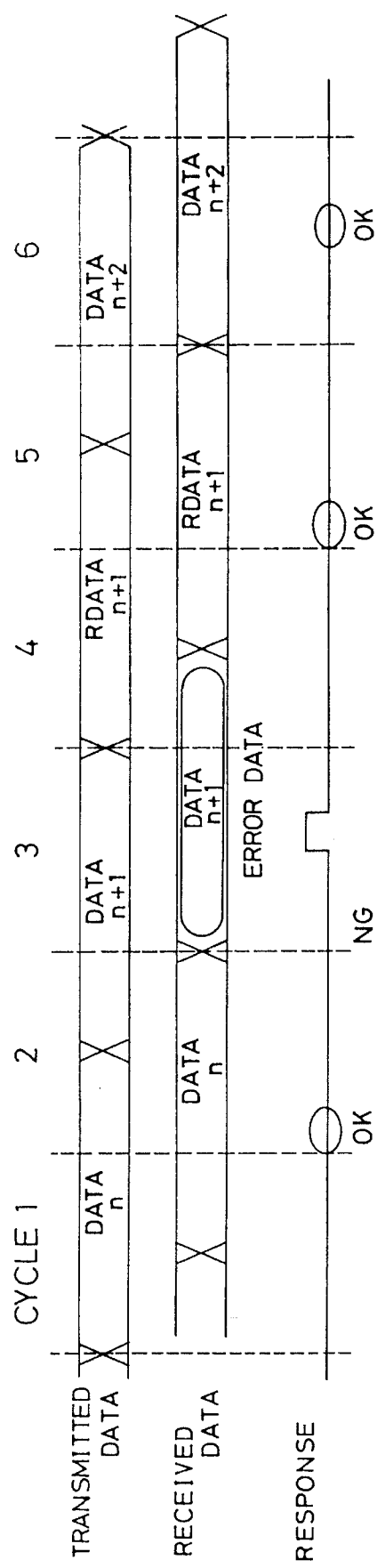
FIG. 16 is a time chart showing the operation of the data transfer device shown in FIG. 14.

FIG. 4 is a time chart showing the above-mentioned operations of the data transmitter 100a and the data receiver 200a. After the data transmitter 100a transmits data (for example, DATA n+1: present data), it is not confirmed that the retransmission request signal 14 related to the present data is received and the next data (DATA n+2) is consecutively transmitted in a pipeline fashion. After the data receiver 200a receives the present data (DATA n+1), it is not confirmed that the present data has errors and the next data (DATA n+2) is consecutively received in a pipeline fashion. In the case where the present data (DATA n+1) has errors, both the present data and the next data are abandoned in the data receiver 200a. Then, the retransmission data (DATA n+1) is immediately transmitted from the data latch 108 of the data transmitter 100a through the data selector 110. In addition, the next data (DATA n+2) from the FIFO memory 102 is immediately retransmitted following the retransmission data (RDATA n+1). According to the present embodiment, data transfer can be carried out at a higher speed and data retransmission can be performed more smoothly as compared with the prior art shown in FIG. 16.

Figure 5:
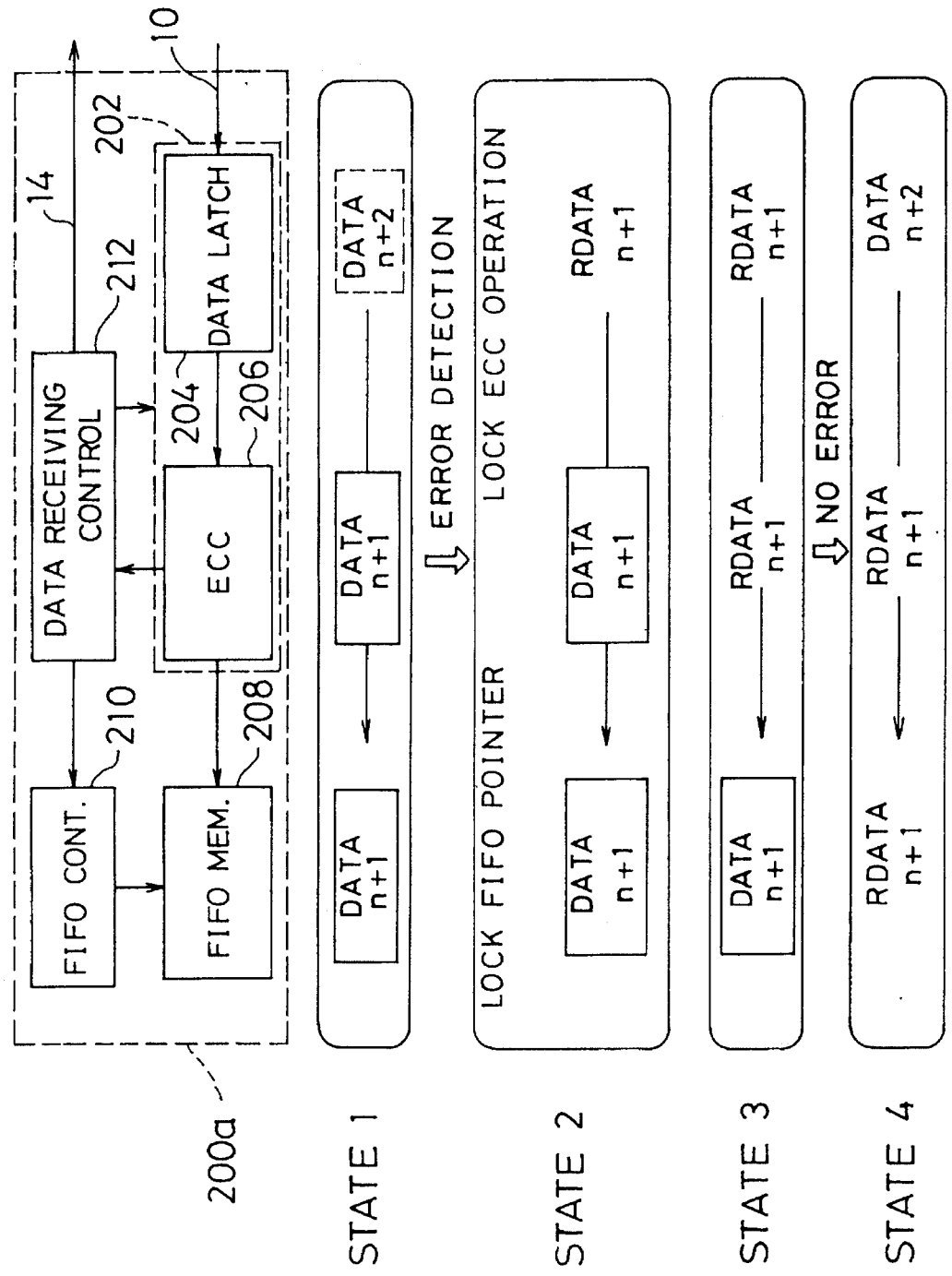
FIG. 5 is a state transition diagram showing the operation of the data receiver shown in FIG. 1.

FIG. 5 is a state transition diagram showing the operation of the data receiver 200a. In FIG. 5, the received data having errors (DATA n+1: present data) is canceled through the locking of the FIFO pointer, and the next data (DATA n+2) is neglected through the locking of the ECC circuit 206.

Figure 6:
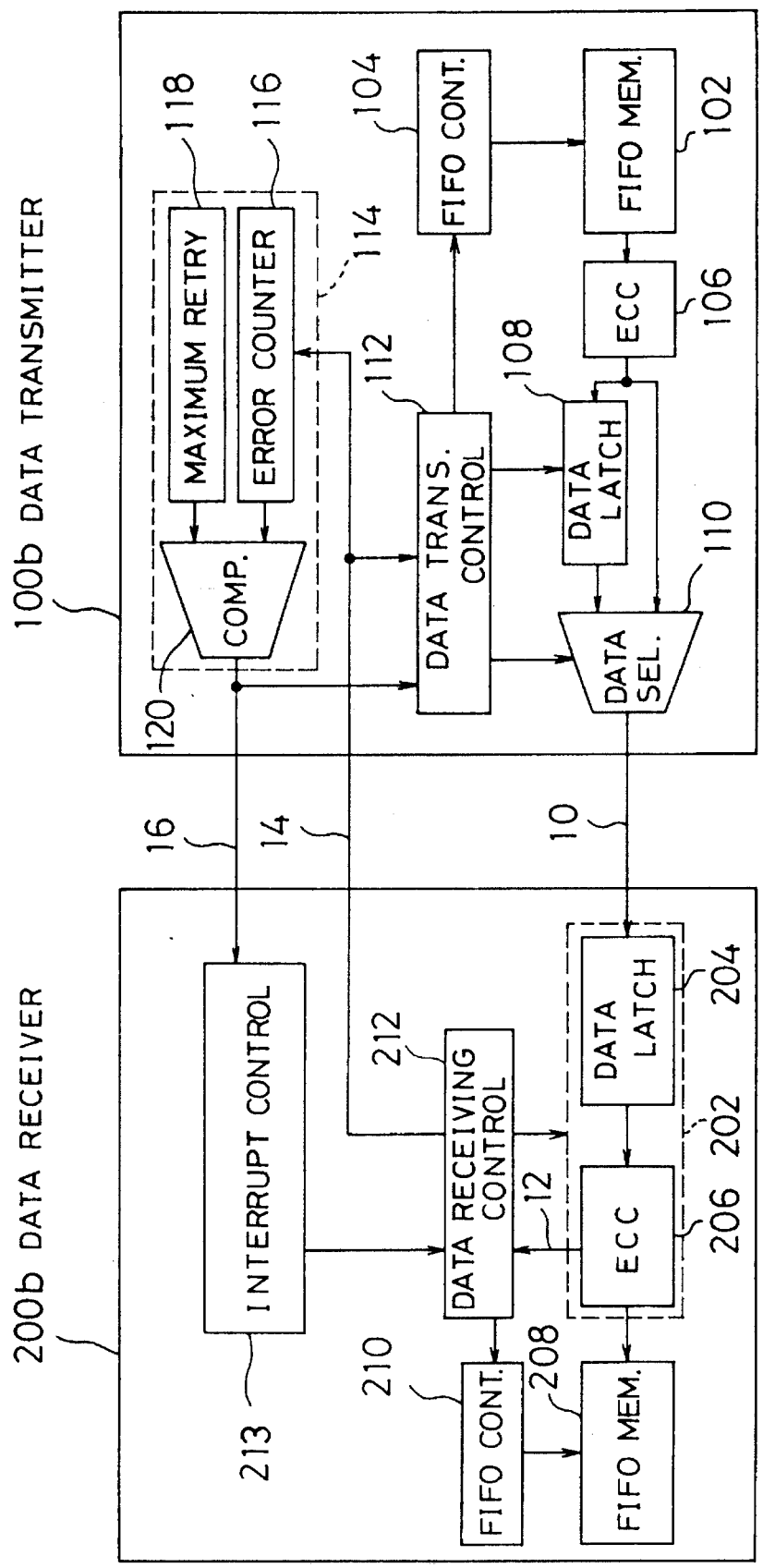
FIG. 6 is a block diagram showing the structure of variant of the data transfer device shown in FIG. 1.

FIG. 6 is a block diagram showing the structure of a variant of the data transfer device shown in FIG. 1. A data transmitter 100b shown in FIG. 6 is obtained by adding a retransmission inhibiting circuit 114 to the data transmitter 100a shown in FIG. 1. A data receiver 200b shown in FIG. 6 is obtained by adding an interrupt control circuit 213 to the data receiver 200a shown in FIG. 1.

The retransmission inhibiting circuit 114 includes an error counter 116, a maximum retry number setting circuit 118 and a comparator 120. The error counter 116 serves to count the retransmission request signals 14 from the data receiver 200b. The comparator 120 serves to output a retransmission inhibiting signal 16 when a value counted by the error counter 116 reaches a value set by the maximum retry number setting circuit 118. When the data transmitting control circuit 112 receives the retransmission inhibiting signal 16 from the comparator 120, the data retransmitting operations are terminated.

Not only instantaneous failure caused by crosstalk and the like but also continuous failure (for example, permanent failure such as disconnection) sometimes occur on a data transfer path. Referring to the data transmitter 100a shown in FIG. 1, in the case where the instantaneous failure occurs, the data retransmitting operations are terminated when the retransmission data is correctly received by the data receiver 200a. Then, the consecutive data transmitting operations are started. In the case where the permanent failure occurs, however, the data retransmitting operations are infinitely repeated. Referring to the data transmitter 100b shown in FIG. 6, it is possible to distinguish between the instantaneous failure and the continuous failure. In the case where the continuous failure occurs on the data transfer path, the data retransmitting operations are forcibly terminated when the retransmission request signals 14 related to the same data are received predetermined times.

The retransmission inhibiting signal 16 from the comparator 120 of the retransmission inhibiting circuit 114 is transmitted to the data receiver 200b. In the data receiver 200b, the interrupt control circuit 213 terminates the data re-receiving operations of the data receiving control circuit 212 when the retransmission inhibiting signal 16 is received. In addition, all the data stored in the FIFO memory 208 are fetched so that the data receiving is terminated. There can be adopted a structure in which the retransmission inhibiting circuit 114 is provided on the data receiver 200b side so as to transmit the retransmission inhibiting signal 16 from the data receiver to the data transmitter.

Second Embodiment

Figure 7:
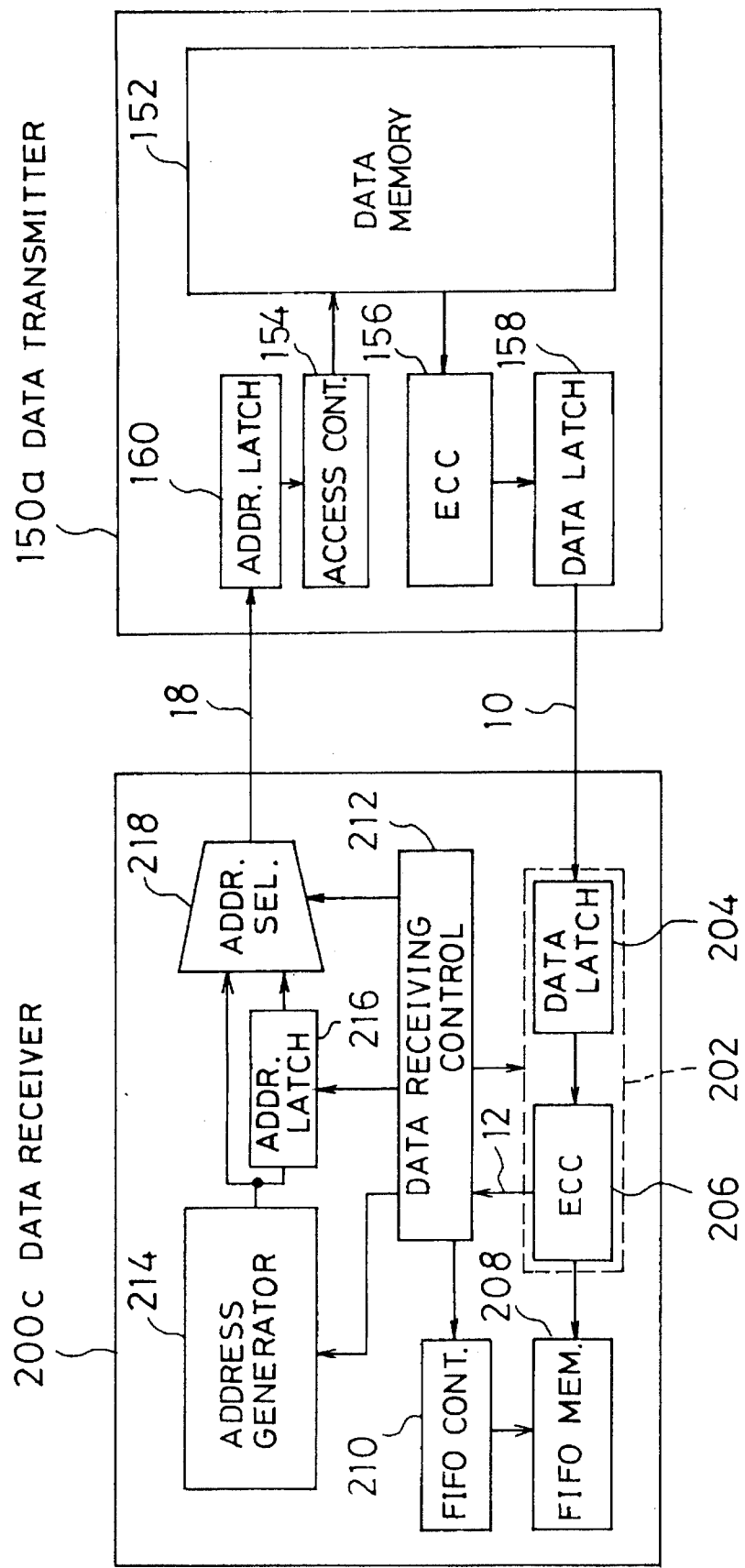
FIG. 7 is a block diagram showing the structure of a data transfer device according to a second embodiment of the present invention.

FIG. 7 is a block diagram showing the structure of a data transfer device according to a second embodiment of the present invention. In FIG. 7, a data transmitter is indicated at 150a, and a data receiver is indicated at 200c. Data transfer is executed between the data transmitter 150a and the data receiver 200c. The data receiver 200c serves to sequentially transmit addresses 18 for specifying data to be transferred, and to sequentially receive data 10 transferred from the data transmitter 150a according to the transmitted addresses.

The data transmitter 150a includes a data memory 152, a memory access control circuit 154, an ECC circuit 156, a data latch 158 and an address latch 160. The data memory 152 serves to store a plurality of data to..be transmitted, and data in the data memory 152 can randomly be fetched according to an given address. The memory access control circuit 154 serves to control data fetch from arbitrary storage locations in the data memory 152. The ECC circuit 156 has an error correcting code adding circuit. The data latch 158 is a circuit for sequentially holding data which is obtained by adding error correcting codes to the data from the data memory 152, and for transmitting the same as the transfer data 10. The address latch 160 serves to receive the address 18 for specifying data to be transmitted and to hold the received address. The received address is provided to the memory access control circuit 154.

The data receiver 200c shown in FIG. 7 is obtained by adding an address generating circuit 214, an address latch 216 and an address selector 218 to the data receiver 200a shown in FIG. 1. The address generating circuit 214 serves to sequentially generate addresses which are to be transmitted by the data receiver 200c. The address latch 216 is a circuit for sequentially holding addresses from the address generating circuit 214. The address selector 218 has a function of transmitting either of the address from the address generating circuit 214 and the address held by the address latch 216. The data receiving control circuit 212 according to the present embodiment serves to control the operations of the data receiving circuit 202 and the FIFO control circuit 210 correspondingly to the presence of the error detecting signal 12 from the ECC circuit 206, and to control the operations of the address generating circuit 214, the address latch 216 and the address selector 218.

Figure 8:
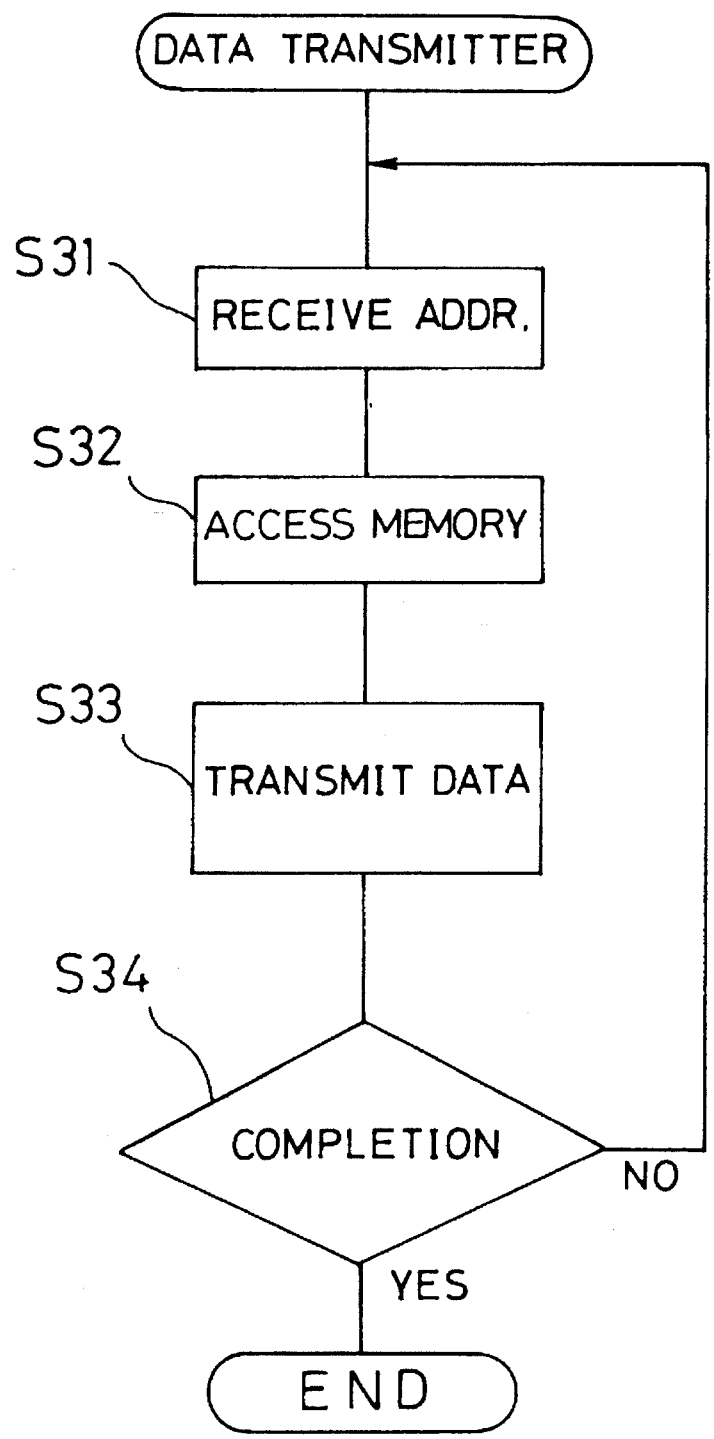
FIG. 8 is a flow chart showing the operation of a data transmitter shown in FIG. 7.
Figure 9:
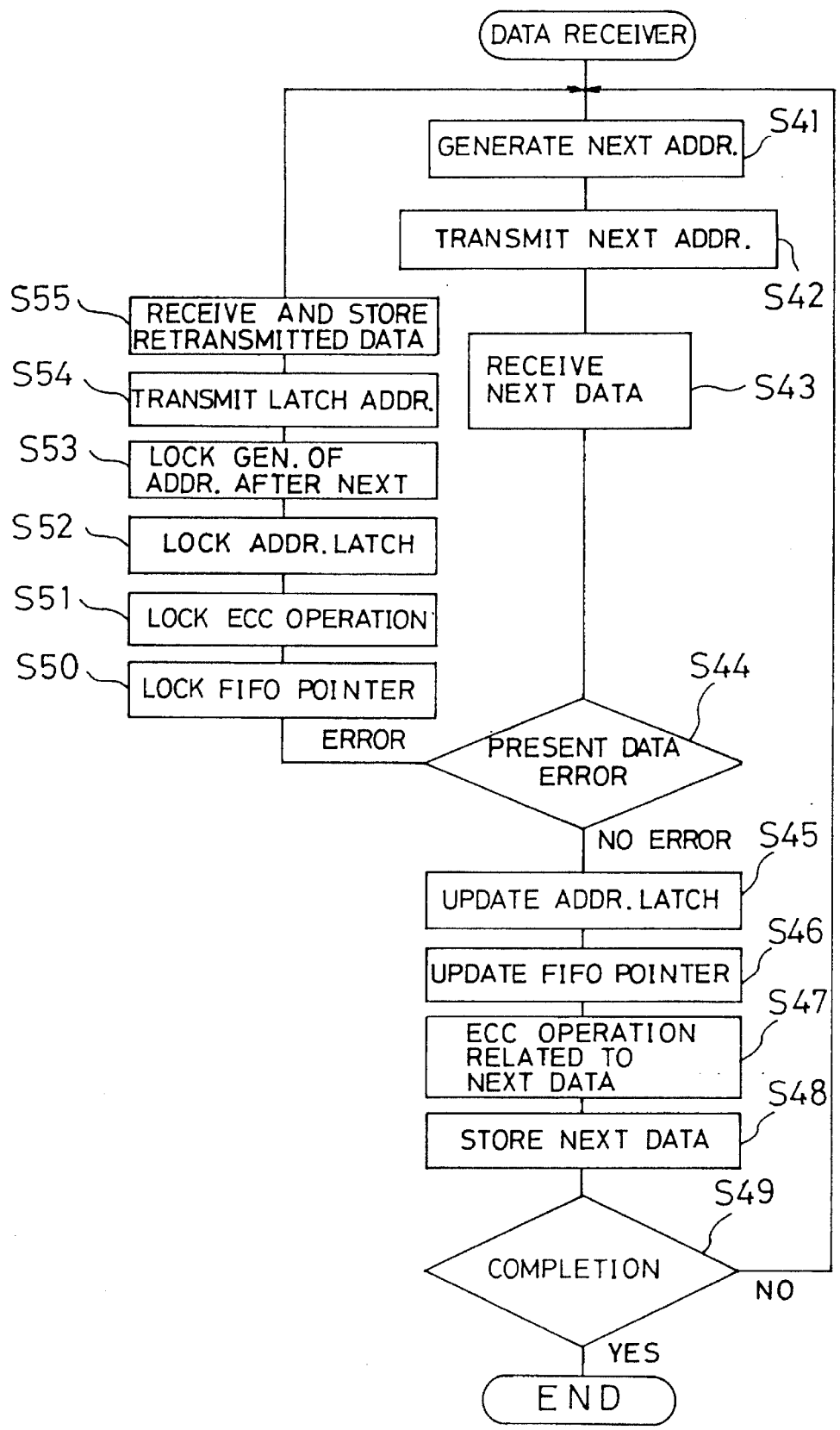
FIG. 9 is a flow chart showing the operation of a data receiver shown in FIG. 7.
Figure 10:
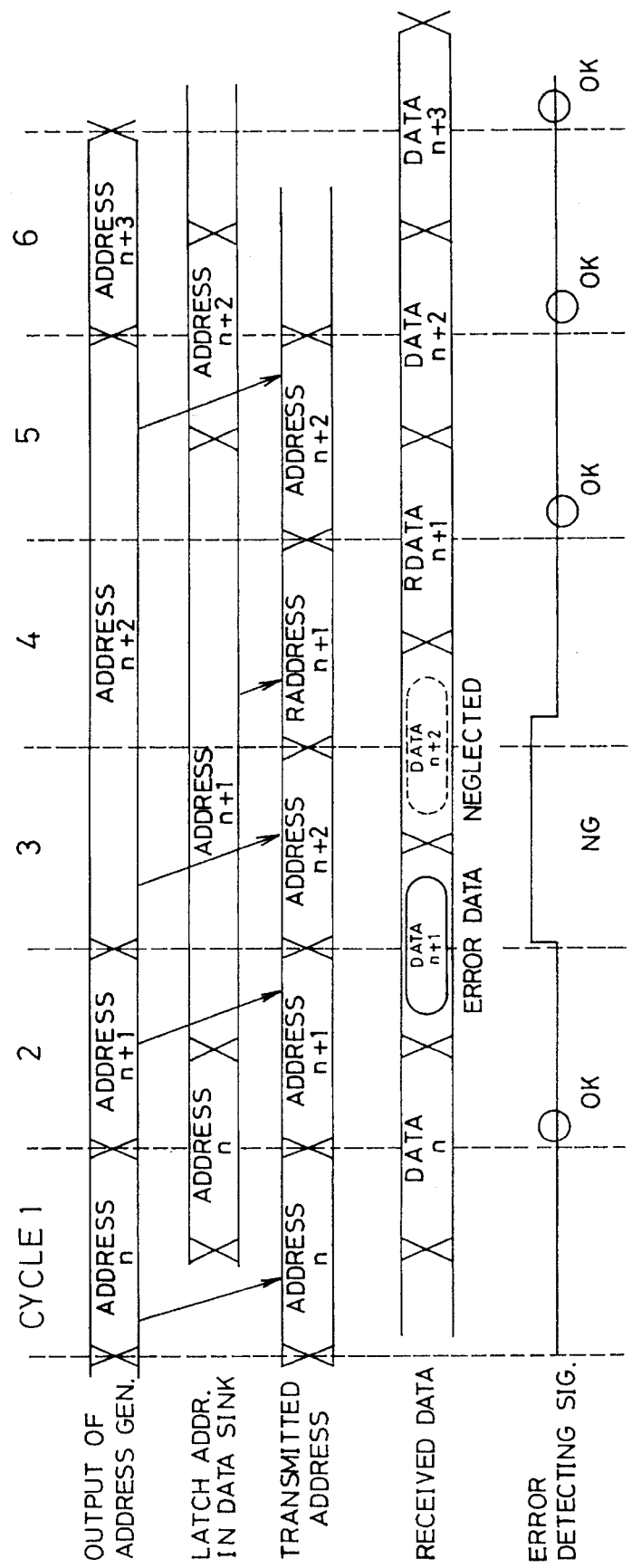
FIG. 10 is a time chart showing the operation of the data receiver shown in FIG. 7.

With reference to FIGS. 8 to 10, there will be described the operation of the data transfer device having the above-mentioned structure according to the second embodiment of the present invention.

FIG. 8 is a flow chart showing the operation of the data transmitter 150a shown in FIG. 7. The address latch 160 receives the address 18 transferred from the data receiver 200c (Step S31). The memory access control circuit 154 fetches from the data memory 152 data to be transmitted according to the address held by the address latch 160 (Step S32). An error correcting code is added to the data from the data memory 152 by the ECC circuit 156, and the data thus obtained is transmitted through the data latch 158 (Step S33).

FIG. 9 is a flow chart showing the operation of the data receiver 200c shown in FIG. 7. As shown in FIG. 9, while the error detecting signal 12 is not generated, the data receiving control circuit 212 executes a loop in which a step proceeds from S41 to S49 and then returns to S41. More specifically, the address generating circuit 214 is enabled to generate an address. The address is transmitted from the address generating circuit 214 to the address selector 218. The address latch 216 is caused to hold the address from the address generating circuit 214. The data receiving circuit 202 is enabled to receive the data transferred from the data transmitter 150a according to the transmitted address. The data outputted from the data receiving circuit 202 is stored in the FIFO memory 208.

Data (the present data) according to an address (the present address) is stored in the FIFO memory 208, and the address generating circuit 214 is enabled to generate the next address (Step S41). The next address is transmitted from the address generating circuit 214 to the address selector 218 (Step S42). The data latch 204 is enabled to receive the next data transferred from the data transmitter 150a according to the next address which has been transmitted (Step S43). It is decided whether the error detecting signal 12 related to the present data which has been received is generated by the ECC circuit 206 (Step S44). In this case, the FIFO pointer of the FIFO control circuit 210 indicates a region of the FIFO memory 208 in which the present data has been stored.

When it is decided that the error detecting signal 12 related to the present data is not generated, a series of consecutive address transmitting and consecutive data receiving operations are executed. More specifically, the address latch 216 is caused to hold the next address from the address generating circuit 214 (Step S45). The present data stored in the FIFO memory 208 is approved to update the FIFO pointer of the FIFO control circuit 210 (Step 46). The ECC circuit 206 is enabled to execute the check and output related to the next data which has been received (Step S47). The next data outputted from the ECC circuit 206 is stored in the FIFO memory 208 (Step S48). The address generating circuit 214 is enabled to generate the address after next (Step S41). The address after next from the address generating circuit 214 is transmitted to the address selector 218 (Step S42). The data latch 204 is caused to receive the data after next transferred from the data transmitter 150a according to the address after next which has been transmitted (Step S43).

When it is decided that the error detecting signal 12 related to the present data is generated, a series of address retransmitting and data re-receiving operations are executed. More specifically, the update of the FIFO pointer of the FIFO control circuit 210 is inhibited such that the present data (having errors) stored in the FIFO memory 208 is abandoned (Step S50). The check and output related to the next data is inhibited from being executed by the ECC circuit 206 such that the next data which has been received is neglected (Step S51). The present address held by the address latch 216 is not updated to the next address from the address generating circuit 214 but is maintained (Step S52). The address after next is inhibited from being generated by the address generating circuit 214 (Step S53). The present address held by the address latch 216 is transmitted as a retransmission address to the address selector 218 (Step S54). The data receiving circuit 202 is enabled to execute the receipt, check and output related to the retransmission data transferred from the data transmitter 150a according to the retransmission address which has been transmitted. The retransmission data outputted from the data receiving circuit 202 is stored in the FIFO memory 208 according to the locked FIFO pointer (Step S55). The address retransmitting and data re-receiving operations are repeated while the error detecting signal 12 is generated by the ECC circuit 206.

FIG. 10 is a time chart showing the operation of the data receiver 200c. Referring to the data receiver 200c, after an address (for example, ADDRESS n+1: present address) is transmitted, it is not confirmed that the error detecting signal 12 related to the present data (DATA n+1) transferred according to the present address is generated and the next address (ADDRESS n+2) is consecutively transmitted in a pipeline fashion. After the present data (DATA n+1) is received, it is not confirmed that the error detecting signal 12 related to the present data is generated and the next data (DATA n+2) is consecutively received in a pipeline fashion. In the case where the present data (DATA n+1) has errors, both the present data and the next data are abandoned in the data receiver 200c. Then, a retransmission address (RADDRESS n+1) is immediately transmitted from the address latch 216 of the data receiver 200c through the address selector 218. In addition, the next address (ADDRESS n+2) is immediately retransmitted from the address generating circuit 214 following the retransmission address (RADDRESS n+1). In similar to the first embodiment, the data transfer can be carried out at a higher speed and the data retransmission can be performed more smoothly as compared with the prior art.

Third Embodiment

Figure 11:
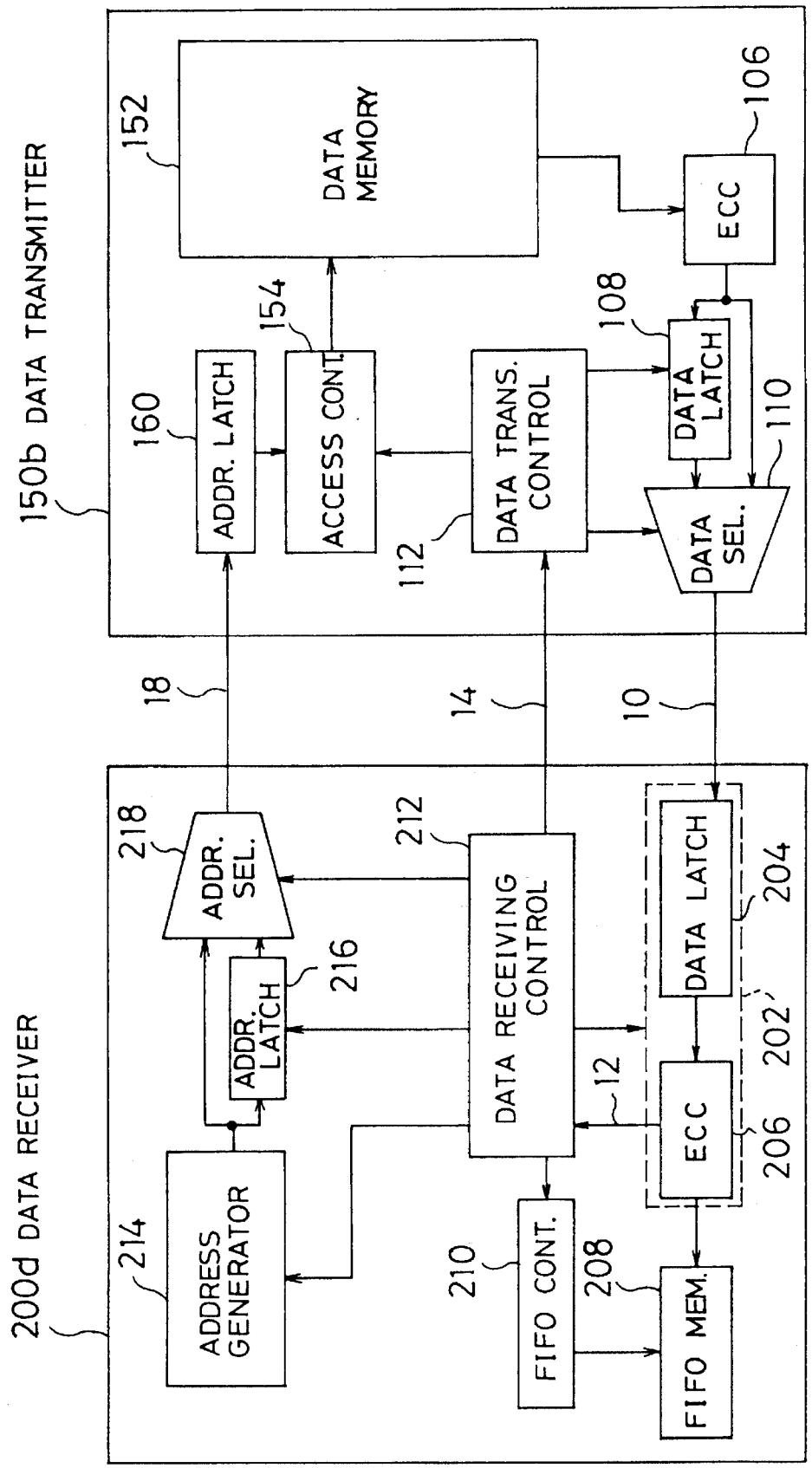
FIG. 11 is a block diagram showing the structure of a data transfer device according to a third embodiment of the present invention.

FIG. 11 is a block diagram showing the structure of a data transfer device according to a third embodiment of the present invention. In FIG. 11, a data transmitter is indicated at 150b and a data receiver is indicated at 200d. Data transfer is executed between the data transmitter 150b and the data receiver 200d.

In the data transmitter 150b shown in FIG. 11, the FIFO memory 102 and FIFO control circuit 104 of the data transmitter 100a shown in FIG. 1 (First Embodiment) are replaced with the data memory 152, memory access control circuit 154 and address latch 160 of the data transmitter 150a shown in FIG. 7 (Second Embodiment). The data transmitter 150b serves to sequentially transmit data 10 according to received addresses 18, and to receive a retransmission request signal 14. The data receiver 200d shown in FIG. 11 serves to transmit the retransmission request signal 14 to the data receiving control circuit 212 of the data receiver 200c shown in FIG. 7 (Second Embodiment), to sequentially transmit the addresses 18 for specifying data to be transferred, and to sequentially receive the data 10 transferred from the data transmitter 150b according to the transmitted addresses.

Referring to the data transfer device having the above-mentioned structure according to the third embodiment, both retransmission data and retransmission addresses are always prepared. Consequently, a retransmitting operation can be carried out at a higher speed.

Fourth Embodiment

Figure 12:
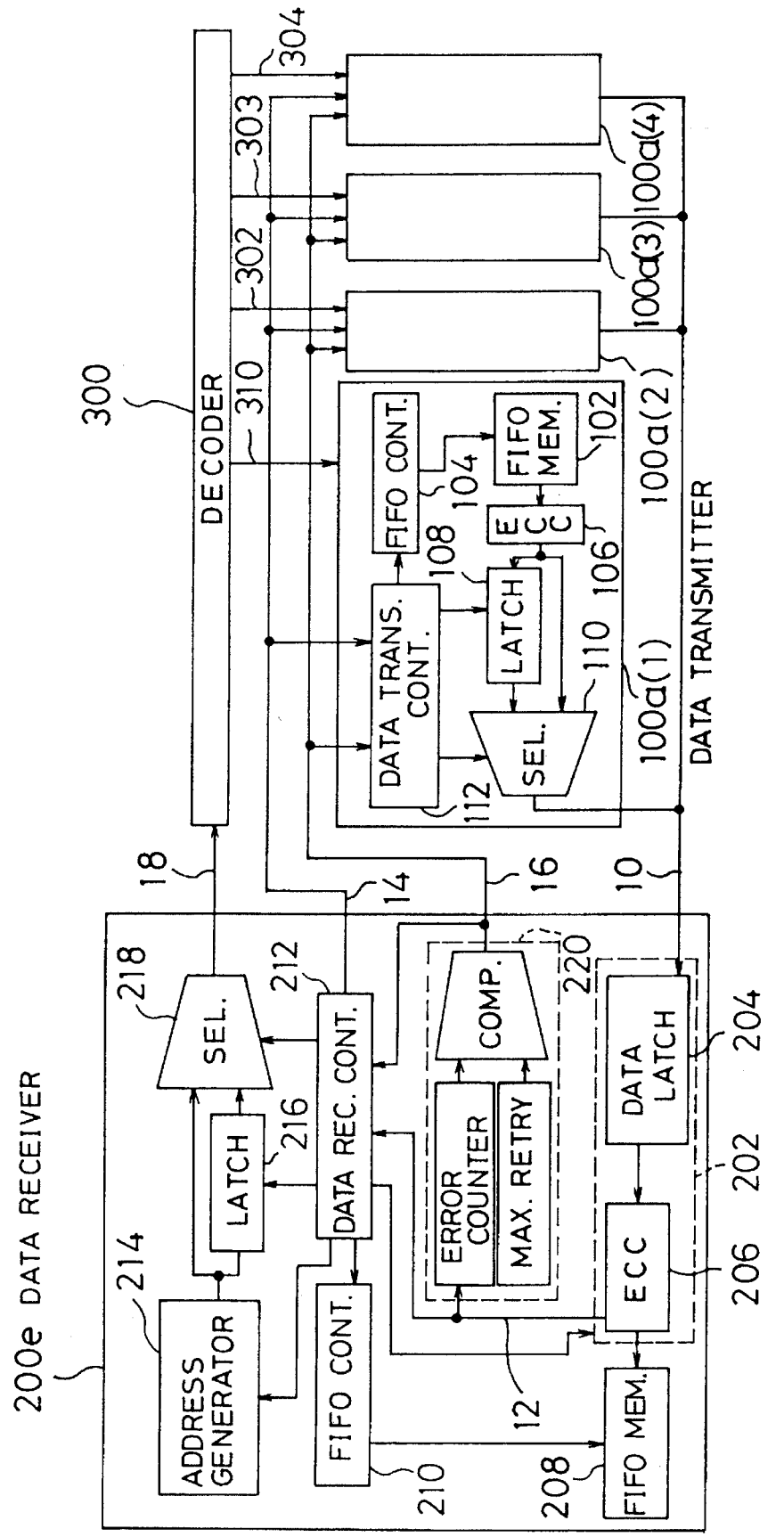
FIG. 12 is a block diagram showing the structure of a data transfer device according to a fourth embodiment of the present invention.

FIG. 12 is a block diagram showing the structure of a data transfer device according to a fourth embodiment of the present invention. Referring to the data transfer device, a decoder 300 is provided between data transmitters 100a (1) to (4) and a data receiver 200e.

Each of the data transmitters 100a (1) to (4) shown in FIG. 12 has the same structure as that of the data transmitter 100a shown in FIG. 1 (First Embodiment). The data receiver 200e shown in FIG. 12 is obtained by adding a retransmission inhibiting circuit 220 to the data receiver 200d shown in FIG. 11 (Third Embodiment) in similar to the data transmitter 100b shown in FIG. 6 (a variant of First Embodiment. The data receiver 200e according to the fourth embodiment serves to sequentially transmit a device address for selecting one of the data transmitters 100a (1) to (4), and to sequentially receive data 10 transferred based on the transmitted device address. The decoder 300 serves to sequentially output chip select signals 301 to 304 corresponding to the data transmitters 100a (1) to (4) based on the device addresses 18 which are sequentially transmitted from the data receiver 200e. A retransmission request signal 14 and a retransmission inhibiting signal 16 outputted respectively from the data receiving control circuit 212 and retransmission inhibiting circuit 220 of the data receiver 200e are distributed to the data transmitting control circuits 112 of the data transmitters 100a (1) to (4).

When the device address 18 for specifying a first data transmitter 100a (1) is outputted from the data receiver 200e as a data sink, only a first chip select signal 301 is made active and the first data transmitter 100a (1) is selected as a data source. Pipeline data transfer is executed between the first data transmitter 100a (1) and the data receiver 200e. When the device address 18 for specifying a second data transmitter 100a (2) is outputted from the data receiver 200e, only a second chip select signal 302 is made active and the second data transmitter 100a (2) is selected as a data source. Pipeline data transfer is executed between the second data transmitter 100a (2) and the data receiver 200e. In addition, the device addresses 18 are consecutively transmitted from the data receiver 200e in a pipeline fashion. In this case, the transmitted device addresses are sequentially held by the address latch 216. In the case where an error detecting signal 12 related to received data is generated, the transmitted device address held by the address latch 216 is immediately transmitted as a retransmission address. According to the present embodiment, there can be realized high-speed data transfer and smooth data retransmission in parallel with the selection of data source. Furthermore, in the case where the error detecting signals 12 related to the same data are generated predetermined times by the operation of the retransmission inhibiting circuit 220, retransmitting operations are terminated on the data source and data sink.

Fifth Embodiment

Figure 13:
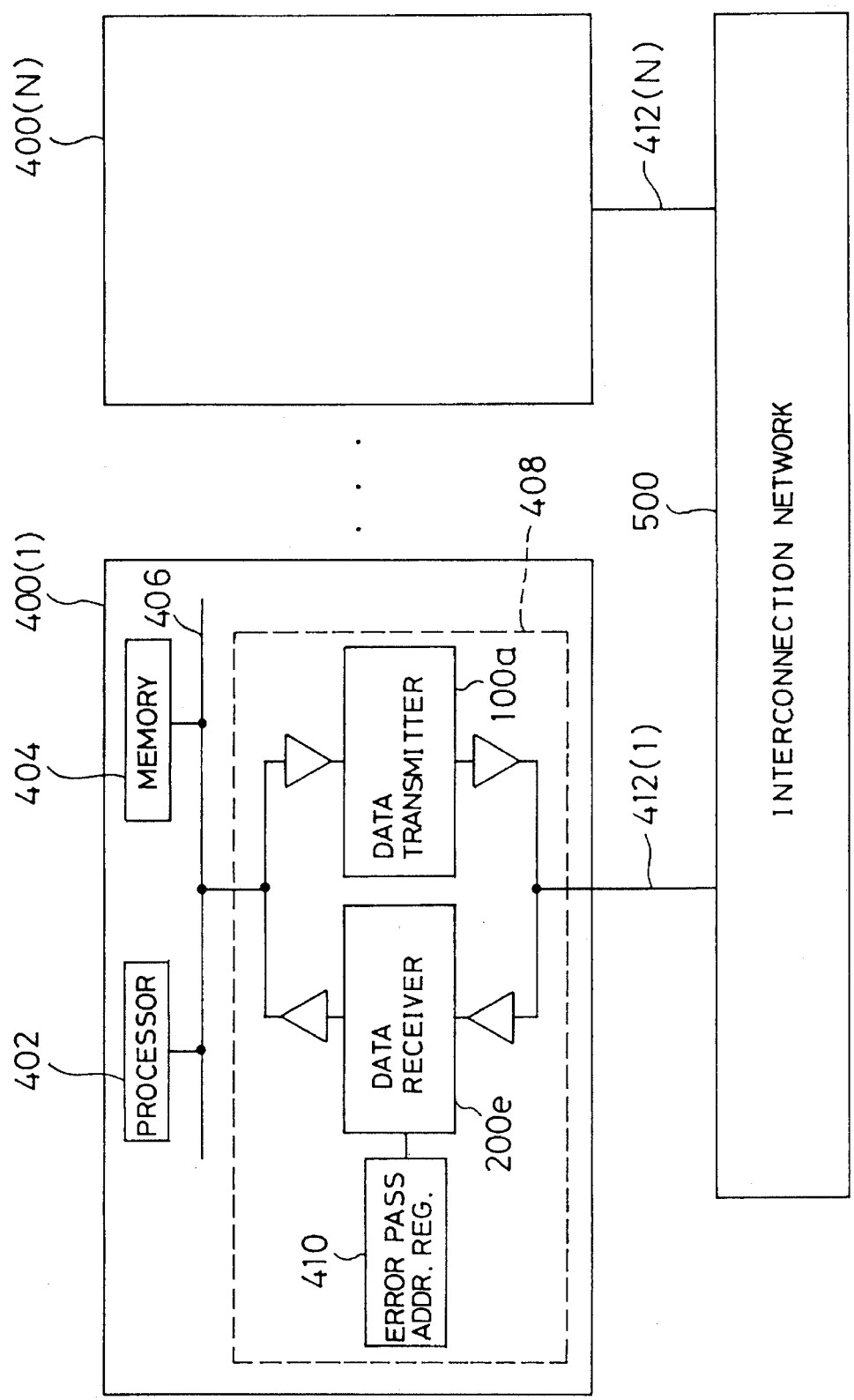
FIG. 13 is a block diagram showing the structure of a multiprocessor system including a plurality of processor elements which have data transfer devices according to a fifth embodiment of the present invention.
Figure 14:
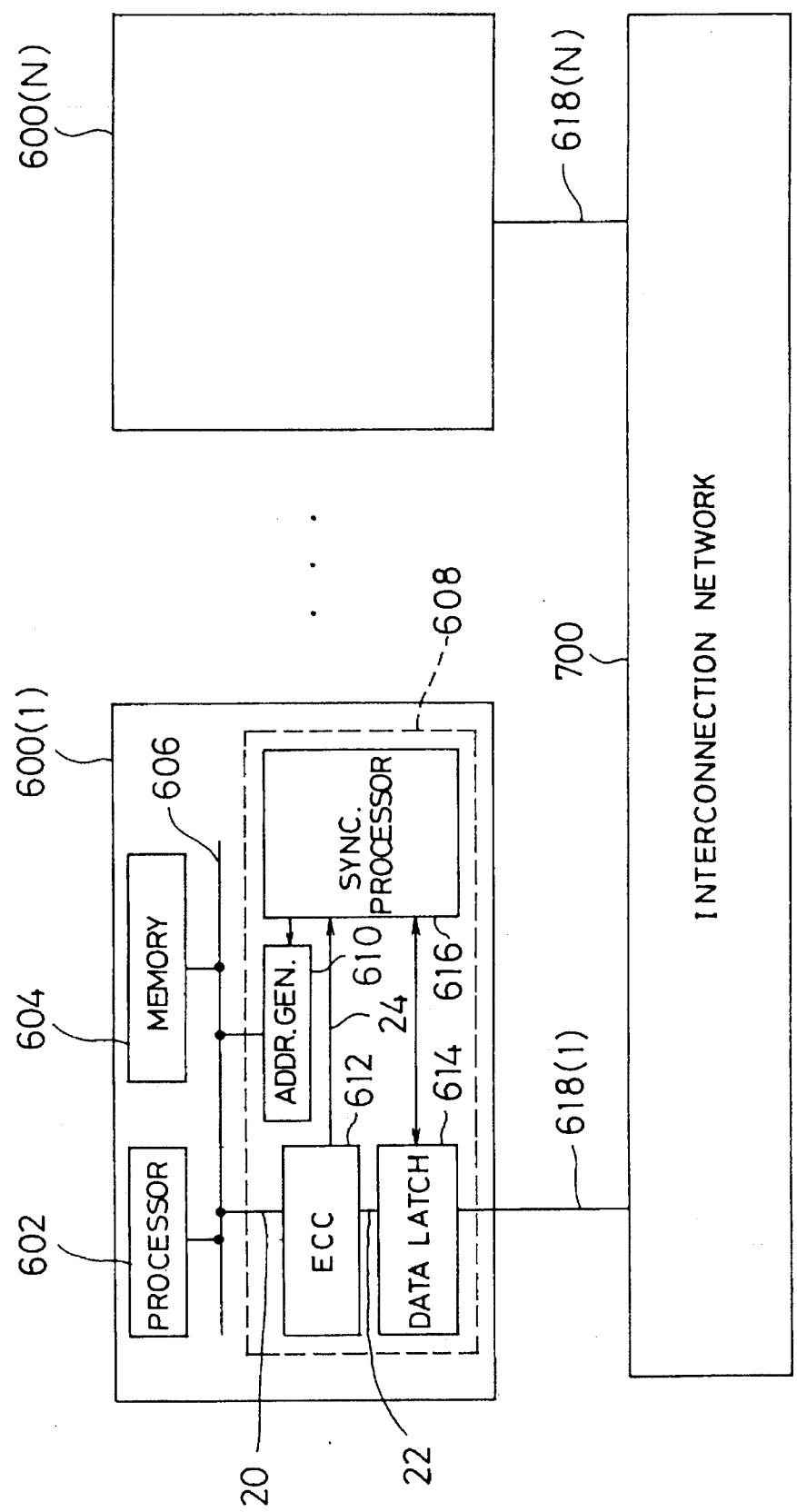
FIG. 14 is a block diagram showing the structure of a multiprocessor system including a plurality of processor elements which have data transfer devices according to the prior art.

FIG. 13 is a block diagram showing the structure of a multiprocessor system which includes N processor elements 400 (1) to (N) having data transfer devices 408 according to a fifth embodiment of the present invention. The processor elements 400 (1) to (N) are linked to one another through an interconnection network 500 having a plurality of paths. Each processor element 400 has a processor 402 for executing instructions, a memory 404 for storing instructions and data, an internal bus 406, and a data transfer device 408 for data communication with other processor elements according to the present embodiment. External buses 412 (1) to (N) are provided between the interconnection network 500 and the data transfer devices 408 of the processor elements 400 (1) to (N).

The data transfer device 408 shown in FIG. 13 comprises a data transmitter 100a for transmitting data to other processor elements, a data receiver 200e for receiving data transferred from other processor elements, and an error pass address register 410 connected to the data receiver 200e. The data transmitter 100a has the same structure as those of the data transmitters 100a (1) to (4) shown in FIG. 12 (Fourth Embodiment). The data receiver 200e has the same structure as that of the data receiver shown in FIG. 12 (Fourth Embodiment). The decoder 300 shown in FIG. 12 is incorporated in the interconnection network 500. When the error pass address register 410 receives a retransmission inhibiting signal 16 from a retransmission inhibiting circuit 220 in the data receiver 200e, the error pass address register 410 holds a retransmission address in the address latch 216 as an address of a fault path of the interconnection network 500, and then inhibits an address generating circuit 214 of the data receiver 200e from generating a device address corresponding to the address of the fault path.

According to the present embodiment, there is executed pipeline data transfer including data retransmission between two processor elements which are optionally selected from the processor elements 400 (1) to (N). By the operation of the error pass address register 410, in the case where permanent failure occurs on a part of the interconnection network 500, the fault path is prevented from being reused. If the processor 402 is interrupted when the address of the fault path is stored in the register 410, the processor 402 is informed of the occurrence of failure on the data transfer path. The processor 402 can obtain information for specifying fault paths in the interconnection network 500 with reference to the error path address register 410 and can also change a path to be used based on the information.

Although the present invention has fully been described by way of example in five embodiments with reference to the accompanying drawings, it is to be understood that various changes and modifications will be apparent to those skilled in the art. For example, the data latch 108 and address latch 216 for holding one retransmission data and one retransmission address can be replaced with memories each of which can hold a plurality of data or addresses (preferably, FIFO memories). The ECC circuits 106, 156, 206 can be replaced with parity check circuits for example. Therefore, unless otherwise such changes and modifications depart from the scope of the invention, they should be construed as being included therein.

We claim:

1. A data receiver for sequentially transmitting addresses each of which indicates data to be transferred and for sequentially receiving data transferred according to the transmitted addresses, comprising:

address generating means for sequentially generating addresses to be transmitted, address holding means for holding the address from said address generating means, address transmitting means for transmitting either the address from said address generating means or the address held by said address holding means, data receiving means for receiving data according to the address transmitted from said address transmitting means, checking the presence of errors in the received data, outputting the received data, and generating an error detecting signal when the received data has errors, and data receiving control means for controlling said address generating means, address holding means and address transmitting means according to the generation or the lack of generation of an error detecting signal by said data receiving means, by inhibiting the address generating means, maintaining the address in the address holding means, and transmitting the address held in the address holding means as a retransmission address, in response to an error detecting signal, or, by enabling the address generating means to generate addresses, updating the address held by the address holding means, and transmitting the addresses generated by the address generating means, in the absence of an error detecting signal, wherein said data receiving control means enables said address generating means to generate a present address, causes said address transmitting means to transmit the present address from said address generating means, and causes said address holding means to hold the present address from said address generating means, then said data receiving control means enables said address generating means to generate the next address and causes said address transmitting means to transmit the next address from said address generating means, and then said data receiving control means decides whether an error detecting signal related to the present data received according to the present address transmitted from said address transmitting means is generated by said data receiving means, wherein if an error detecting signal related to the present data is not generated, said data receiving control means executes a series of consecutive address transmitting operations in which said address holding means is caused to hold the next address from said address generating means, said address generating means is enabled to generate the address after next, and said address transmitting means is caused to transmit the address after next from said address generating means, and wherein if an error detecting signal related to the present data is generated, said data receiving control means executes a series of address retransmitting operations in which said address holding means is caused to maintain the present address so that the present address is not updated to the next address from said address generating means, said address generating means is inhibited from generating the address after next, and said address transmitting means is caused to transmit as a retransmission address the present address held by said address holding means, wherein said data receiver in the absence of an error detecting signal transmits addresses consecutively in a pipeline fashion and sequentially holds the addresses being transmitted, and in the presence of an error detecting signal temporarily suspends the transmission of addresses and immediately transmits the address held by the address holding means, so that all the addresses are processed during an address transmission cycle, wherein said data receiver comprises a normal address transmission cycle which does not allocate any portion thereof for the retransmission of a data address, said receiver upon generation of the error detecting signal retransmits the address stored in the address holding means.

2. The data receiver according to claim 1, wherein said data receiving means receives the next data transferred according to the next address transmitted from said address transmitting means in parallel with checking the presence of errors in the received present data.

3. The data receiver according to claim 1, further comprising address retransmission terminating means for receiving an error detection signal and for outputting a retransmission inhibiting signal to said data receiving control means so as to terminate the retransmission of an address when the error detecting signal related to the same data is generated by said data receiving means a predetermined number of times.

4. The data receiver according to claim 1, further comprising:

receiving data storage means for storing data from said data receiving means, and data storage control means for controlling the storage of data from said data receiving means in said receiving data storage means, wherein said data receiving control means enables said data receiving means to execute the receipt, check and output related to the present data transferred according to the present address transmitted from said address transmitting means, and causes said data storage control means to store the present data outputted from said data receiving means in said receiving data storage means, then said data receiving control means enables said data receiving means to receive the next data transferred according to the next address transmitted from said address transmitting means, and then said data receiving control means decides whether an error detecting signal related to the present data is generated by said data receiving means, wherein if the error detecting signal related to the present data is not generated, said data receiving control means executes a series of consecutive data receiving operations in which the present data stored in said receiving data storage means by said data storage control means is confirmed so that the present data remains, said data receiving means is enabled to execute the check and output related to the next data which has been received, said data storage control means is caused to store the next data outputted from said data receiving means in said receiving data storage means, and said data receiving means is enabled to receive the data after next transferred according to the address after next transmitted from said address transmitting means, and wherein if the error detecting signal related to the present data is generated, said data receiving control means executes a series of data re-receiving operations in which the present data stored in said receiving data storage means by said data storage control means is revoked so that the present data is canceled, said data receiving means is inhibited from executing the check and output related to the next data which has been received and is enabled to execute the receipt, check and output related to the retransmission data transferred according to the present address transmitted as a retransmission address from said address transmitting means, and said data storage control means is caused to store the retransmission data outputted from said data receiving means in said receiving data storage means.

5. The data receiver according to claim 4, wherein said receiving data storage means includes a FIFO memory of First-In-First-Out-type, for storing data from said data receiving means, said data storage control means includes a FIFO control circuit having a FIFO pointer which specifies the storage location of the data to be stored in said FIFO memory, wherein said FIFO control circuit has functions of updating said FIFO pointer when data storage is confirmed by said data receiving control means, and of suspending the update of said FIFO pointer when data storage is revoked by said data receiving control means.

6. The data receiver according to claim 4, further comprising data re-receiving terminating means for receiving an error detection signal and for controlling said data receiving control means to terminate the re-receipt of data when the error detecting signal related to the same data is generated by said data receiving means a predetermined number of times.

7. A data transfer device comprising:

a plurality of data transmitters, a data receiver including:

address generating means for sequentially generating addresses to be transmitted, address holding means for holding the address from said address generating means, address transmitting means for transmitting either the address from said address generating means or the address held by said address holding means, data receiving means for receiving data transferred from one of said plurality of data transmitters according to the address transmitted from said address transmitting means, checking the presence of errors in the received data, outputting the received data, and generating an error detecting signal when the received data has errors, and data receiving control means for controlling the operations of said address generating means, address holding means and address transmitting means according to the generation of the error detecting signal by said data receiving means, said data receiver sequentially transmitting device addresses each of which is to be decoded to select one of said data transmitters and of sequentially receiving data transferred based on the transmitted device addresses, and a decoder for sequentially outputting select signals corresponding to each of said data transmitters as a data transfer source for said data receiver based on the device address transmitted from said data receiver, wherein said data receiver in the absence of an error detecting signal transmits addresses consecutively in a pipeline fashion and sequentially holds the addresses being transmitted, and in the presence of an error detecting signal temporarily suspends the consecutive transmission of addresses and immediately transmits the address held in the address holding means.

8. A data transfer device for use in each of a plurality of processor elements which are linked to one another through an interconnection network having a plurality of paths, said data transfer device comprising:

a data receiver including, address generating means for sequentially generating addresses to be transmitted, address holding means for holding the address from said address generating means, address transmitting means for transmitting either the address from said address generating means or the address held by said address holding means as a retransmission address, data receiving means for receiving data transferred according to the address transmitted from said address transmitting means, checking the presence of errors in the received data, outputting the received data, and generating an error detecting signal when the received data has errors, data receiving control means for controlling the operations of said address generating means, address holding means and address transmitting means according to the generation of the error detecting signal by said data receiving means for retransmitting addresses in response to said error detecting signal, and address retransmission terminating means for outputting a retransmission inhibiting signal so as to terminate the address retransmitting operations of said data receiving control means when the error detecting signal related to the same data is generated by said data receiving means a predetermined number of times, said data receiver for use in receiving data transferred from other processor elements; and error pass storage means for holding a retransmission address held by said address holding means as an address of a fault path of said interconnection network when the retransmission inhibiting signal is received from said address retransmission terminating means, and for inhibiting said address generating means from generating an address corresponding to the address of the fault path.

\* \* \* \* \*